United States Patent [19]

Riegler et al.

[11] 4,092,053
[45] May 30, 1978

[54] BEARING ARRANGEMENT FOR A TILTING TRUNNION OF A METALLURGICAL VESSEL

[75] Inventors: Ernst Riegler, Enns; Manfred Schmidt, Linz, both of Austria

[73] Assignee: Vereinigte Osterreichische Eisen- und Stahlwerke-Alpine Montan Aktiengesellschaft, Linz, Austria

[21] Appl. No.: 764,209

[22] Filed: Jan. 31, 1977

[30] Foreign Application Priority Data

Feb. 3, 1976 Austria .................................. 729/76

[51] Int. Cl.² ............................................ F16C 29/02
[52] U.S. Cl. ........................................ 308/3 R; 266/91;
266/245; 308/72; 308/207 R; 308/214; 340/269
[58] Field of Search ........... 308/72, 73, 207 R, 207 A,
308/214, 212, 176, 1 A, 1 R, 35, 6 R, 237 R, 237
A, 15, 3 R, 6, 5, 3 A, 3 B, 3 C, 3 CH; 340/269;
73/140, 141 R; 266/245, 91; 200/61.4

[56] References Cited

U.S. PATENT DOCUMENTS

| 2,808,563 | 10/1957 | Hornbostel | 340/269 |
| 3,523,714 | 8/1970 | Puhringer | 308/35 X |
| 3,745,819 | 7/1973 | Earl | 73/140 X |

*Primary Examiner*—Trygve M. Blix
*Assistant Examiner*—Douglas C. Butler
*Attorney, Agent, or Firm*—Brumbaugh, Graves, Donohue & Raymond

[57] ABSTRACT

A bearing arrangement for a tilting trunnion of a metallurgical vessel, in particular a converter in a steel making plant, has an inner race, an outer race, bearing bodies arranged therebetween, and at least one sensor device with a sensor pin. The sensor device penetrates the outer race and contacts the inner race forming a sensing point. Also, the sensor device has a fixed point with the sensor pin being movable relative to the fixed point and the distance between the sensing point and the fixed point being measurable.

14 Claims, 4 Drawing Figures

BEARING ARRANGEMENT FOR A TILTING TRUNNION OF A METALLURGICAL VESSEL

BACKGROUND OF THE INVENTION

The invention relates to a bearing for the tilting trunnion of a metallurgical vessel, in particular a converter of a steel making plant, having an inner race, an outer race and rolling or sliding bodies arranged therebetween.

In more recently developed metal production processes, in particular in steel making processes, the weight changes of the materials charged in the converter vessel are used for controlling the production process. Curves of the changes of the weight of the bath are plotted for monitoring the process. From the paths of these curves conclusions can be drawn on the carbon content of the melt, on the temperature of the bath, as well as on the tendency towards slopping. Thus, during a heat, a precise weighing of the materials charged and the fluxing agents is of great importance.

For carrying out such a weighing it has been known to mount the bearing housings directly, or via bridges, on force measuring means. It is a pre-requisite for an exact weighing that only vertical forces act on the force measuring means, since transverse forces falsify the measuring result or make it inaccurate. For this reason care must be taken that the transverse forces are accommodated by separate construction elements, such as roller guides or tension members acting in the horizontal direction.

SUMMARY OF THE INVENTION

The invention aims at avoiding the above-described disadvantages and difficulties and has as its object to provide a tiltable metallurgical vessel, in particular a converter of a steel making plant, with a weighing means requiring no additional construction elements in order to prevent transverse forces from occurring.

A further object of the invention relates to locating the wear that occurs in the outer race of the bearing after an extended period of use, in order to be able to do something about it.

In a bearing of the above-defined kind these objects are achieved in that at least one sensor means penetrating the outer race and contacting the inner race is provided, which sensor means has a sensor pin that is movable relative to a fixed point on the bearing or on the bearing support so as to provide for the measurement of the distance between the sensing point on the inner race and the fixed point.

For determining the weight changes taking place during a process heat due to the refining reactions, a sensor pin is provided, which pin is aligned with the middle of the bearing and is arranged below the tilting trunnion.

For determining the wear of the bearing, i.e. of the outer race of the bearing, in the course of extended periods of use, for instance over a period of one or more years, an additional sensor pin is provided, which pin is aligned with the middle of the bearing and is arranged above the tilting trunnion.

According to a preferred embodiment, a pendulum roller bearing is used as the bearing with the sensor pin contacting the inner race at the middle web between the two rows of pendulum rollers.

Since during operation, due to sagging of the bearing trunnion caused by the weight of the charge and vibrations caused by refining reactions, wobbling movements can occur on the trunnion, suitably the middle web of the inner race of the bearing is designed to have a spherical face, the center of which lies at the center of the bearing.

BRIEF DESCRIPTION OF THE DRAWING

The invention shall now be described by way of an embodiment and with reference to the accompanying drawings, wherein.

DESCRIPTION OF AN EXEMPLARY EMBODIMENT

Figure 1:
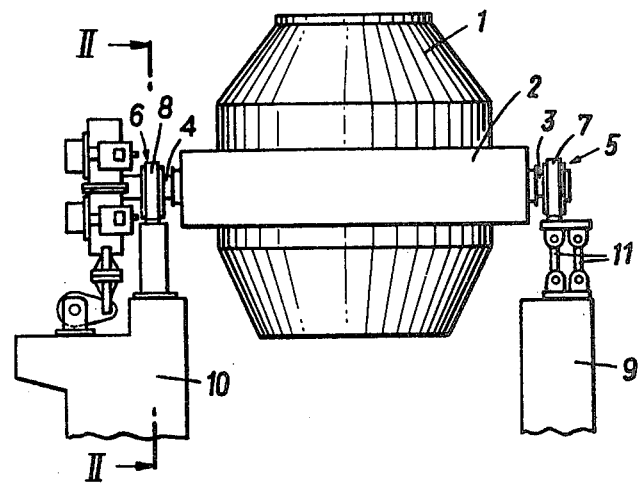
FIG. 1 is a side view of the converter plant.

FIG. 1, a converter of a steel making plant is denoted by 1, which converter is inserted in a carrying ring 2 having two tilting trunnions 3 and 4. The tilting trunnions are mounted in an expansion bearing 5 and a fixed bearing 6, whose bearing housings 7 and 8 are each located on a bearing support comprised of stands 9 and 10, respectively. These stands are stationarily connected with the plant base. The movement of the expansion bearing 5 is effected by parallel guide rods 11.

Figure 2:
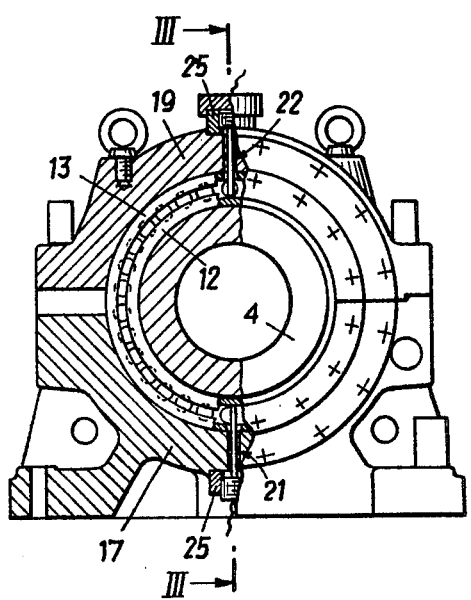
FIG. 2 is a section along line II—II of FIG. 1.
Figure 3:
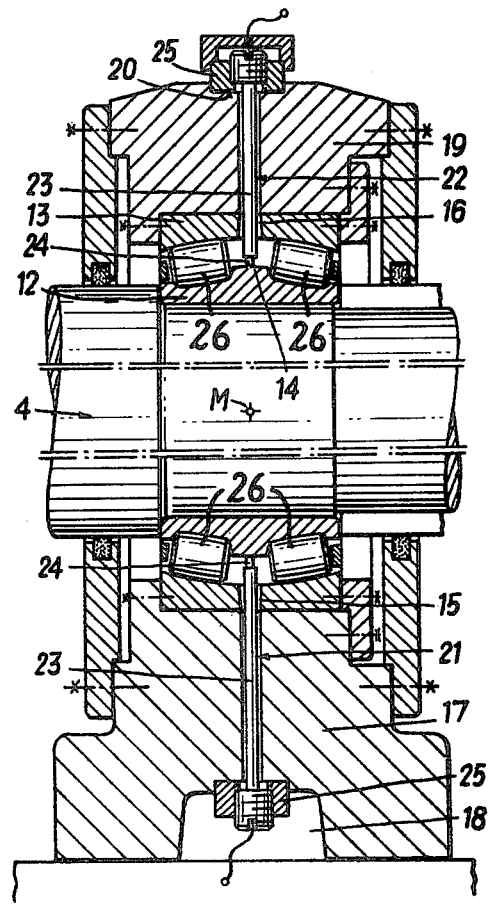
FIG. 3 is a section along line III—III of FIG. 2.
Figure 4:
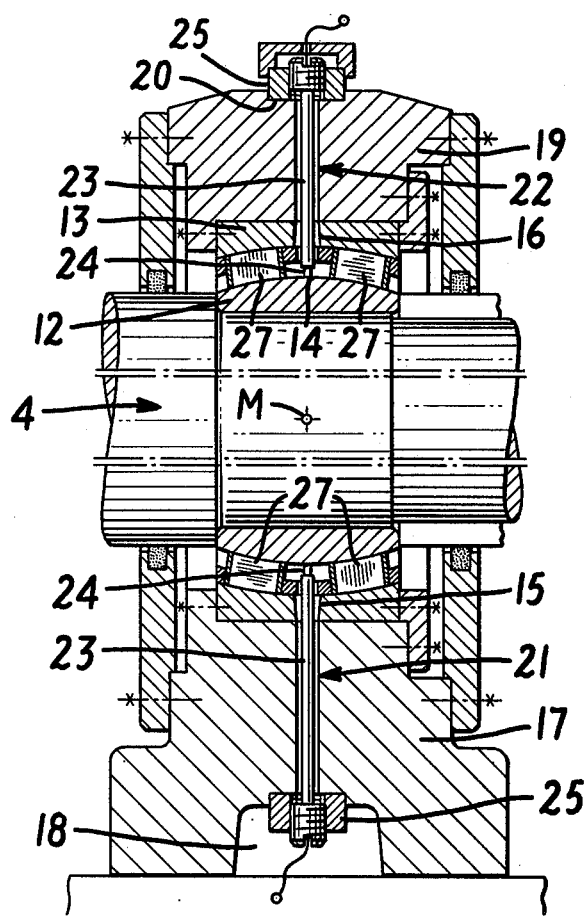
FIG. 4 is a view similar to FIG. 3 showing an alternative embodiment.

According to FIG. 2, the bearing is designed as a pendulum roller bearing with roller bodies 26 and according to FIG. 4 it is designed as a sliding bearing with sliding bodies 27. Both versions of the bearings have an inner race 12 and an outer race 13 with the bearing bodies (26 or 27) therebetween. The middle web 14 (FIG. 3) of the inner race is designed to have a spherical face, the center of which lies at the center M of the bearing. According to the invention, the outer race 13 is penetrated by bore 15 from below and by bore 16 from above. The bore 15 extends through bearing housing lower part 17 into a recess 18. The upper bore 16 extends through bearing housing upper part 19 into a recess 20. Through these bores, a weight sensor means 21 is introduced from below and a wear sensor means 22 is introduced from above, which sensor means each comprise a pipe-like jacket 23 and a sensor pin 24 movably guided therein. The sensor pins are kept in contact with the web 14 by the pressure of a spring. The two sensor means are fixed in the recesses by fastening rings 25. Sensor means of this kind are known per se. The sensing point at the tip of the sensor pin is movable relative to a fixed point within the sensor means and the path of the sensor point, i.e. the respective distance between sensing point and fixed point, can be measured and recorded electrically. The distance indicator means, however, is not illustrated. Depending on the progress of a refining heat, the vertical forces that occur in the bearing change in accordance with the charge weight changes and cause a movement of the sensor pin of the lower sensor means relative to the fixed point. Thus, when the lower sensor means is set at an initial value at the beginning of the refining process, the weight changes can be determined during the heat, recorded, and used as a basis for controlling the process. After an extended period of use a certain wear of the bearing occurs, i.e. of the outer race, and the indication of the upper sensor means changes in that the distance from the sensing point to the fixed point of the upper sensor means increases. When measured over a long period of time, this increase of the sensor path reflects the progress of the wear of the bearing. In this way not only can weight changes be noticed and watched during each heat, but also the condition of the bearing over long periods of use can be followed. When the wear has reached a pre-determined amount, the bearing outer race can be rotated, suitably by 90°, in order to re-create the original running characteristics. Thus the upper sensor means is only set at an initial value when the bearing is put into operation as well as after a rotation of the outer race, and the wear is checked in relation to this initial value.

What we claim is:

1. In a bearing arrangement for a tilting trunnion of a metallurgical vessel, in particular for a converter in a steel making plant, of the type including a bearing within a bearing housing, having an inner race, an outer race and bearing bodies arranged therebetween, the improvement comprising at least one sensor means for measuring changes in the weight of the vessel contents or the wear of the bearing and having a sensor pin, which at least one sensor means penetrates the outer race of the bearing and contacts the inner race thus forming a sensing point, the at least one sensor means also having a fixed point with the sensor pin being movable relative to the fixed point, the distance between the sensing point and the fixed point being measurable.

2. A bearing arrangement as set forth in claim 1, wherein said bearing bodies are rolling bodies.

3. A bearing arrangement as set forth in claim 1, wherein the bearing bodies are sliding bodies.

4. A bearing arrangement as set forth in claim 1, wherein the fixed point of the at least one sensor means is arranged on the bearing housing.

5. A bearing arrangement as set forth in claim 1, further comprising a bearing support, the fixed point of the at least one sensor means being arranged on said bearing support.

6. A bearing arrangement as set forth in claim 1, wherein the sensor pin is arranged so as to be vertically aligned with the middle of the bearing below the tilting trunnion in order to measure changes in the weight of the vessel contents.

7. A bearing arrangement as set forth in claim 6, further comprising a second sensor pin arranged so as to be vertically aligned with the middle of the bearing above the tilting trunnion in order to additionally measure the wear of the bearing.

8. A bearing arrangement as set forth in claim 6, wherein the bearing is a pendulum roller bearing having two rows of pendulum rollers as bearing bodies and a middle web provided on the inner race and located between the two rows of pendulum rollers, the sensor pin contacting the inner race at said middle web.

9. A bearing arrangement as set forth in claim 8, wherein the middle web is designed so as to have a spherical face whose center lies at the center of the bearing.

10. A bearing arrangement as set forth in claim 1, wherein the sensor pin is arranged so as to be vertically aligned with the middle of the bearing above the tilting trunnion in order to measure the wear of the bearing.

11. A bearing arrangement as set forth in claim 10, wherein the bearing is a pendulum roller bearing having two rows of pendulum rollers as bearing bodies, and a middle web provided on the inner race and located between the two rows of pendulum rollers, the sensor pin contacting the inner race at said middle web.

12. A bearing arrangement as set forth in claim 11, wherein the middle web is designed so as to have a spherical face whose center lies at the center of the bearing.

13. A bearing arrangement as set forth in claim 1, wherein the bearing is a pendulum roller bearing having two rows of pendulum rollers as bearing bodies, and a middle web provided on the inner race and located between the two rows of pendulum rollers, the sensor pin being arranged so as to be vertically aligned with the middle of the bearing below the tilting trunnion and contacting the inner race at said middle web in order to measure changes in the weight of the vessel contents, a second sensor pin being located so as to be vertically aligned with the middle of the bearing above the tilting trunnion and also contacting the inner race at said middle web in order to measure the wear of the bearing.

14. A bearing arrangement as set forth in claim 13, wherein the middle web is designed so as to have a spherical face whose center lies at the center of the bearing.

* * * * *